United States Patent
Prakash et al.

(10) Patent No.: US 10,332,104 B2
(45) Date of Patent: Jun. 25, 2019

(54) TECHNIQUES FOR AN IN-VEHICLE ELECTRONIC WALLET

(71) Applicant: INTEL CORPORATION, Santa Clara, CA (US)

(72) Inventors: Gyan Prakash, Beaverton, OR (US); Saurabh Dadu, Tigard, OR (US); Rajesh Poornachandran, Portland, OR (US); Phillip Sitbon, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/129,931

(22) PCT Filed: Aug. 1, 2013

(86) PCT No.: PCT/US2013/053164
§ 371 (c)(1),
(2) Date: Dec. 28, 2013

(87) PCT Pub. No.: WO2015/016929
PCT Pub. Date: Feb. 5, 2015

(65) Prior Publication Data
US 2015/0220916 A1    Aug. 6, 2015

(51) Int. Cl.
*G06Q 20/36* (2012.01)
*G06Q 20/40* (2012.01)
*G07B 15/06* (2011.01)

(52) U.S. Cl.
CPC ......... *G06Q 20/3674* (2013.01); *G06Q 20/36* (2013.01); *G06Q 20/363* (2013.01); *G06Q 20/40* (2013.01); *G07B 15/063* (2013.01)

(58) Field of Classification Search
None
See application file for complete search history.

(56) References Cited

U.S. PATENT DOCUMENTS

| | | | |
|---|---|---|---|
| 6,526,335 B1 | 2/2003 | Treyz et al. | |
| 6,574,603 B1 | 6/2003 | Dickson et al. | |
| 8,407,144 B2 | 3/2013 | Roberts et al. | |
| 9,073,554 B2 | 7/2015 | Hyde et al. | |
| 2010/0057624 A1* | 3/2010 | Hurt et al. | 705/76 |
| 2010/0280956 A1 | 11/2010 | Chutorash et al. | |
| 2013/0024364 A1* | 1/2013 | Shrivastava et al. | 705/39 |

(Continued)

OTHER PUBLICATIONS

International Search Report and Written Opinion received for PCT Patent Application No. PCT/US2013/053164, dated Apr. 25, 2014, 13 pages.

*Primary Examiner* — Joseph W. King

(57) ABSTRACT

Various embodiments are generally directed to an apparatus, method and other techniques for activating a payment account for a vehicle electronic wallet component and to associate the payment account with a vehicle. In various embodiments, a request for payment for a transaction may be received over a contactless communication link when the vehicle is in proximity to a payment processing entity and authentication information to approve the request for payment may be received. Payment information corresponding to the payment account may be transmitted over the contactless communication link to the payment processing entity to enable payment for the transaction.

25 Claims, 9 Drawing Sheets

(56) References Cited

U.S. PATENT DOCUMENTS

2013/0329888 A1* 12/2013 Alrabady ........... G06Q 20/3224
                                                      380/270
2014/0324692 A1* 10/2014 Yarbrough et al. ............. 705/42

* cited by examiner

TECHNIQUES FOR AN IN-VEHICLE ELECTRONIC WALLET

TECHNICAL FIELD

Embodiments described herein generally relate to an in-vehicle electronic wallet and management and processing of an in-vehicle electronic wallet. In particular, embodiments relate to activating one or more payment accounts for an electronic wallet integrated into a motor vehicle and enabling the one or more payment accounts for one or more transactions.

BACKGROUND

Computing devices, such as in-vehicle navigation systems and in-vehicle infotainment systems are becoming more ubiquitous and versatile. As demand grows, computing device design also grows to support more features such as applications for processing electronic transactions. The electronic transaction market is currently filled with many types of credit cards, debit cards, stored value cards, and loyalty cards, all of which may be offered by different issuers, vendors, and providers. Some of the cards are tailored to be redeemed from a retailer while others may be redeemed by financial institutions. Other cards have promotions attached to them, e.g., loyalty cards. However, the increasing quantity and complexity of the cards makes organization and redemption increasingly difficult, thus potentially hindering the growth of the market. Historically, cards have been embodied in a tangible medium such as plastic, and thus are susceptible to loss, theft, or simply being left at home when needed. With the continued growth in card-based transactional offerings provided to consumers, many consumers are faced with the burdensome task of organizing, managing, tracking, transporting, and storing all of their credit, debit, stored-value, loyalty, and other types of merchant, vendor, and provider issued cards.

DETAILED DESCRIPTION

Figure 1:
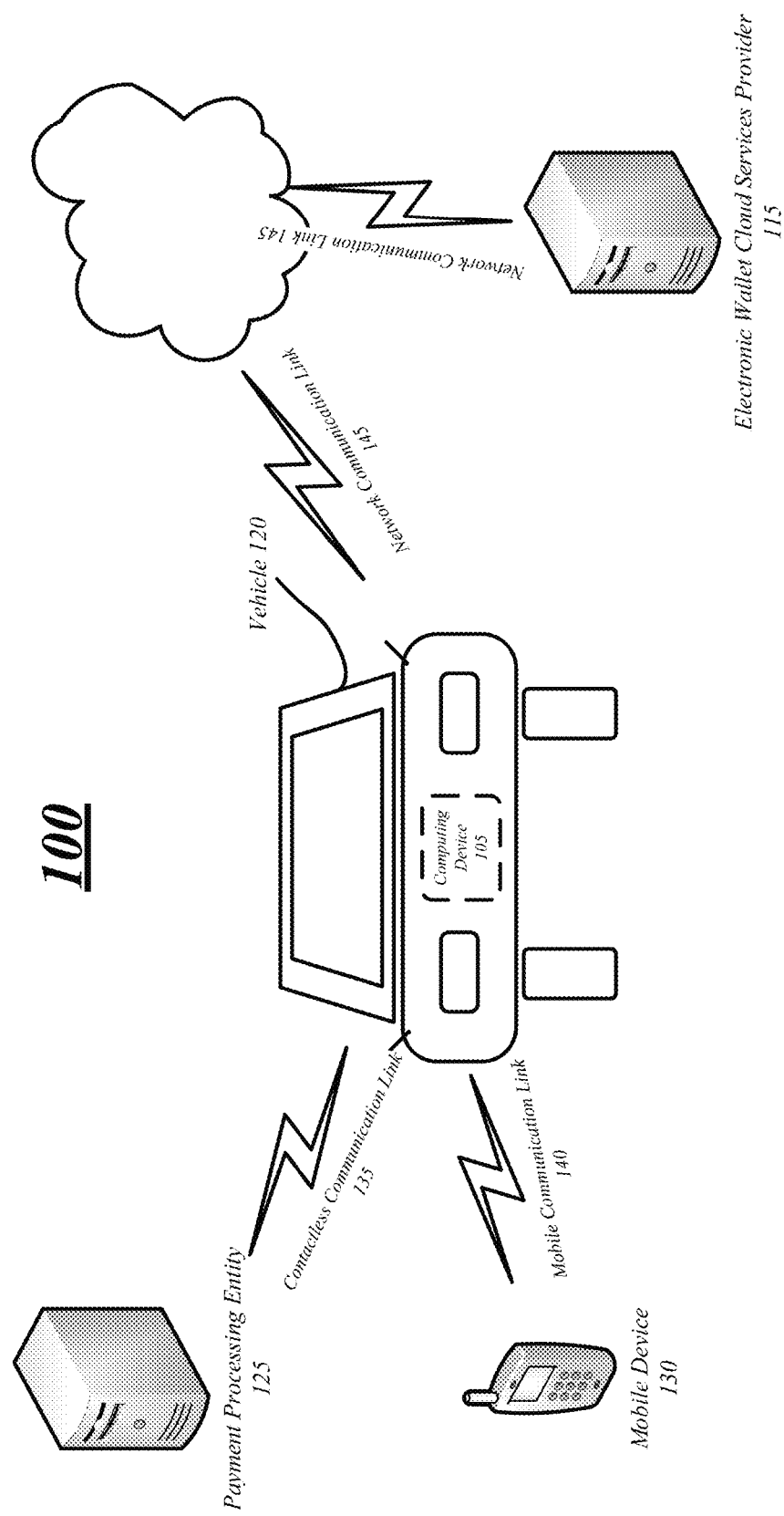
FIG. 1 illustrates an embodiment of a first in-vehicle electronic wallet system.

Various embodiments are generally directed to an in-vehicle electronic wallet apparatus and system. The in-vehicle electronic wallet system may be a standalone system or a system that is integrated into a vehicle navigation system or infotainment system. The in-vehicle electronic wallet system provides a significant advantage because it allows a user to conveniently and securely purchase products and services within a vehicle, based on proximity of a vehicle to a payment processing entity or the like.

In some embodiments, the in-vehicle electronic wallet system enables a user to securely activate and save payment accounts, driver's license information, loyalty card information, gift card information, etc. that may be used while the user is operating a vehicle or process a transaction in or around the vehicle. For example, a user may be able to pay for a toll while driving the vehicle through a toll booth drive through lane or may be able to pay for gas while next to a gas pump using the in-vehicle electronic wallet system as opposed to a traditional payment method that may require the user to stop the vehicle at a toll both or to manually insert a credit card into the gas pump. Various embodiments are not limited in this manner and are discussed in more detail below.

Various embodiments enable a user to receive a request for payment for a transaction and to easily and efficiently authorize or approve the transaction from one or more input means integrated into or associated with a vehicle. For example, the in-vehicle electronic wallet system may receive a request for payment over a near field communication or radio frequency identification communication medium and notify a user of the request for payment through an indicator such as vibrating the steering wheel or displaying the request on a display of the vehicle or a display of a mobile computing device associated with or connected to the vehicle. The user may then authorize the request for payment through one or more input means located in or around the vehicle, such as using a biometric device on a steering wheel or dashboard, a touchscreen display, etc. The in-vehicle electronic wallet system may then transmit payment information to a payment processing entity or point of sale terminal to complete the transaction. Additional embodiments are discussed in more detail below.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities. Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an embodiment of an exemplary communication network system 100 for an in-vehicle electronic wallet system suitable for implementing various embodiments described herein. In various embodiments, the communication network 100 includes a computing device 105 located within or integrated as part of a vehicle 120, an electronic wallet cloud services provider 115, a payment processing entity 125, and a mobile device 130. In addition, the communication network 100 includes a contactless communication link 135, a mobile communication link 140 and a network communication link 145. In various embodiments the contactless communication link 135, the mobile communication link 140 and the network communication link 145 may be the same link or different links. Various embodiments are not limited in this manner. The network system 100 may include any number of devices, servers, and communications links to enable in-vehicle electronic wallet processing and is not limited to the configuration shown in FIG. 1.

Communication links 135, 140 and 145 may comprise any wired or wireless network links to provide communication to and from the computing device 105. In various embodiments, the communication links or portions thereof may be a secure communication link using various encryption methods to prevent data or information from being compromised. The communication links may include one or more apparatuses, devices, servers, databases, systems and circuitry for providing a communication link between the computing device 105 and the other system components, servers, processors, etc. The communication link may include one or more wireless network systems including a wireless local area network (WLAN) system, wireless metropolitan area network (WMAN) system, wireless wide area network (WWAN) system, and so forth. In addition, the communication links may communicate information in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols. Other examples may include systems using infrared techniques or near-field communication techniques and protocols, such as electromagnetic induction (EMI) techniques.

In various embodiments, vehicle 120 may be any vehicle including but not limited to a car, a truck, a bicycle, a motorcycle, a tricycle, a boat, a plane, etc. Vehicle 120 may include one or more vehicle parts including, but is not limited to a dash board, steering wheel, center counsel, gas cap, gas lid, window, rear view minor, side view minor, seat, one or more body panels, one or more wheels, trunk, trunk lid, hood, etc. Further, in some embodiments, vehicle 120 may be associated with vehicle information such as a vehicle identification number, a vehicle registration number, a vehicle license plate number, one or more vehicle part numbers, etc.

In various embodiments, computing device 105 may be an in-vehicle navigation system, an in-vehicle infotainment system, or standalone system built in the vehicle 120. Computing device 105 or portion thereof may be integrated into a portion of the vehicle 120 such as any vehicle part. As a standalone system, the computing system 105 may be able to communicate with an in-vehicle navigation system and/or an in-vehicle infotainment system over one or more wired or wireless networks or systems. Computing device 105 may be any type of computing device and may include any number of components, modules or logic to process electronic wallet transactions and/or to perform any number of other computing functions as would be understood by one skilled in the art.

In some embodiments, the computing system 105 may communicate with the in-vehicle navigation system and/or infotainment system to receive products and services information. For example, the computing system 105 may receive information indicating which of the closest gas stations have the cheapest gas. In another example, the computing system 105 may receive sale information for particular products or services, such as groceries or a car wash. The computing system 105 may receive any type of information relating to products and services from the in-vehicle navigation system and/or infotainment system.

In one or more embodiments, the computing system 105 may send information to the in-vehicle navigation system/or infotainment system. For example, the computing system 105 may provide loyalty card information for the in-vehicle navigation system/or infotainment system to use in determining the closest retailer, store, gas station, etc., associated with the loyalty card. In another example, the computing system 105 may provide information indicating which payment accounts (such as a gas station credit card, grocery store credit card, retail outlet credit card, etc.) are activated for the computing system 105. The in-vehicle navigation system/or infotainment system may use this info to display a location and determine a route to a particular store, retailer, gas station, etc. Computing system 105 is not limited to the above discussed examples and may provide any type of information to the in-vehicle navigation system/or infotainment system. Computing system 105 is discussed in more detail with respect to FIG. 2.

In various embodiments, the communication network 100 may include an electronic wallet cloud services provider 115. The electronic wallet cloud services provider 115 may include one or more apparatuses, devices, servers, databases, systems and circuitry for providing electronic wallet cloud services. The electronic wallet cloud services provider 115 allows a user to manage, update, and configure the computing system 105 and the in-vehicle electronic wallet from a network device over a network connection utilizing various communications technologies, such as cloud computing technology, for example. Cloud computing technology may refer to a set of network resources and infrastructure that are connected over a communication network, such as the Internet, for example. Cloud computing technology may provide a set of shared applications, platforms, and/or services on a converged infrastructure that may be made available to multiple users and re-allocated as per demand. For example, a user may be able to push information to the computing system 105, to add, delete, or update payment accounts and authentication information from a remote computer via the electronic wallet cloud services provider 115.

In various embodiments, the electronic wallet cloud services provider 115 may provide activation services for activating one or more payment accounts for the computing device 105 and an electronic wallet. These activation services may include receiving information including payment account information, the vehicle identification number (VIN), from the computing device 105 to activate the one or more payment accounts. The electronic wallet cloud services provider 115 may activate the account based on a comparison between the information received from the computing device 105 and stored information entered during a registration period, or the like. In some embodiments, the electronic wallet cloud services provider 115 may communicate with another entity, such as a credit card processing entity, to activate the one or more payment accounts. Once activated the payment account may be associated with a user and a particular vehicle based on the VIN for use with processing transactions.

The electronic wallet cloud services provider 115 may also activate other accounts, such as a driver's license account or loyalty card account. The electronic wallet cloud services provider 115 may receive information relating to these accounts, such as a driver's license number or a loyalty card account number, and activate the account based on a comparison between the received data and stored data. Further, the electronic wallet cloud services provider 115, in some embodiments, may communicate with a department of motor vehicles (DMV) or a store associated with the loyalty card to activate the account.

In various embodiments the electronic wallet cloud services provider 115 may store information relating to one or more payment accounts including payment information and payment settings in a secure location of a memory local to the electronic wallet cloud services provider 115 or at a remote location. The payment account may be any credit card account, bank account, checking account, savings account, e-commerce account (e.g., PAYPAL®), pre-paid account, etc. The payment information may include a name, an account number, a credit card number, a billing address, an expiration date, a credit card security code, a card verification number, a credit card type, an account type, a username and password, and any other information related to the payment account. The payment information may be any information related to a payment account.

In one example, the payment account may be a credit card and the account information may be a name, a credit card number (or account number), an expiration date, and a credit card security code. In another example, the payment account may be an e-commerce account, such as a PAYPAL® account, and the payment information may be an account login and password. In a third example, the payment account may be a pre-paid account maintained on the electronic wallet cloud services provider 115 and the account information may be an account number, an account name, a user associated with the account, and a pre-paid amount. Various embodiments are not limited in this manner and the payment information may include any information for a payment account.

In some embodiments, the payment settings may be used to control or manage an associated payment account. The payment settings may include a transaction limit, a transaction locations policy, a transaction authentication policy, user details, parental controls, etc. These payments settings will now be discussed in more detail below.

In one or more embodiments, a transaction limit may be set to prevent a user or a payment processing entity from completing or conducting a transaction larger than the transaction limit. For example, are user may set a $500 dollar transaction limit to prevent a payment processing entity from charging more than this specified amount. The transaction limit may be set on a per transaction basis, a per day basis, or any other basis specified by a user.

The transaction location policy may be set such that a transaction will only be permitted if the current location of the vehicle 120 and/or computing device 105 is an approved or known location. For example, the vehicle 120 and/or the computing device 105 may include a location determination component (e.g. GPS) to determine the vehicle's current location and a transaction will only be permitted if the current location is listed in the transaction locations policy. The transaction location policy may include a list of locations where a user is permitted to conduct a transaction and/or the transaction location policy may include a blacklist where a user is not permitted to conduct a transaction.

In various embodiments, the payment settings may include a transaction authentication policy including a passcode, password, voice passphrase, a biometric characteristic, etc., to use for authentication purposes during a transaction. For example, a user may be required to enter authentication information, such as a password or voice passphrase to authenticate a transaction. Only if user enters the correct authentication information will the transaction be authenticated and completed.

The payment settings may also include parental controls for a payment account. For example, parental controls may be set such that only certain items or services may be purchased. In another example, the parental controls may be set such that items and services are only permitted to be purchased during certain times of the day. Various embodiments are not limited in this context. These and other settings may be pushed or sent to the computing device 105 from the electronic wallet cloud services provider 115.

In various embodiments, the electronic wallet cloud services provider 115 may allow or enable a user to add, delete or modify a payment account, payment information and payment settings for the computing device 105. For example, one or more online accounts may be configured for the computing device 105 on the electronic wallet cloud services provide 115 to transmit and receive information to and from. The online account may allow a user to access and manage one or more payment accounts, payment information and payment settings for the computing device 105. A user may be able to log into the account through a remote computer, such as a home computer or a mobile device with internet access, and manage the one or more payment accounts. The computing device 105 may then receive the information including the one or more payment accounts, payment information and payment settings from the electronic wallet cloud services provider 115 via the network communications link 145 as one or more push messages. In some embodiments, the computing device 105 may access the information via one or more communication links and request the information from the electronic wallet cloud services provider 115. In some embodiments, the computing system 105 may not always have a connection available with electronic wallet cloud services provider 115 and may store the information locally for use during electronic wallet processing.

In some embodiments a user may be able to access and manage one or more payment accounts on the computing device 105 through a direct connection, without accessing or receiving information via the electronic wallet cloud services provider 115. For example, the computing device 105 may access a network while in close proximity to an access point and a user may be able to manage one or more payment accounts directly through the network connection via a computing device or mobile device. In various embodiments, computing device 105 may be able to access the network via one or more communication links, such as communication links 135, 140 and 145.

As previously discussed, the electronic wallet cloud services provider 115 may transmit a payment account, payment information and payment settings to the computing device 105 as one or more push messages or the computing device 105 may request the information from the electronic wallet cloud services provider 115. For example, a payment account modification, a new payment account or an instruction to delete a payment account may be pushed to the computing device 105 over the network communication link 145. Furthermore, the computing device 105 may send or push information to the electronic wallet cloud services provider 115. For example, the computing device 105 may transmit payment account modifications, a new payment account or an instruction to delete a payment account to the electronic wallet cloud services provider 115 over the network communication link 145 when the changes are made directly on the computing device 105.

The electronic wallet cloud services provider 115 may enable a user to create or manage one or more user profiles for the computing device 105. The one or more user profiles may be associated with a particular user and may be activated to use during a transaction. For example, a particular user may be the driver the vehicle and may activate their user profile by enter a password or pass phrase to enable one or more payment accounts for use during a transaction. In some embodiments, each user may create and associate a user profile via the computing device 105, through the mobile device 130, or via another connection (home computer) with the electronic wallet cloud services provider 115. For example, a particular user may setup a user account by entering user information, such as a name and password, and payment account information into the computing device 105 and this information may be sent to the electronic wallet cloud services provider 115 to store as a particular user account for use. However, various embodiments are not limited in this manner and the one or more user accounts and information may be store locally on the computing device 105.

In various embodiments, the electronic wallet cloud services provider 115 may enable a user to authenticate a transaction utilizing one or more payment accounts prior to the vehicle and computing device 105 reaching the retailer, vendor, merchant, etc. For example, a user may be able to select a good or service for purchase and authenticate the purchase via the computing device 105. The purchase information and authentication information may be sent to the electronic wallet cloud services provider 115 via one or more communication links. The electronic wallet cloud services provider 115 may send the information to the merchant or vendor to process the transaction. The electronic wallet cloud services provider 115 may receive information indicating the transaction is complete from the merchant or vendor and send this information to the computing device 105.

Communication network 100 may also include a payment processing entity 125. The payment processing entity 125 may include one or more apparatuses, devices, servers, databases, systems, logic and circuitry for processing a transaction. The payment processing entity 125 may be located at any point of sale location or any other location. For example, the payment processing entity 125 may be located at a gas pump at a gas station, at the drive through window of a fast food chain, or at a payment station of a car wash. In another example, the payment processing entity 125 may be located at a payment station of a toll booth including in a drive through lane. Various embodiments are not limited in this manner and the payment processing entity 125 may be located anywhere where products or services may be purchased or rented or a transaction may occur that is associated with an in-vehicle electronic wallet system.

The computing device 105 may communicate with the payment processing entity 125 over contactless communication link 135. As previously discussed, contactless communication link 135 may include one or more wired or wireless connections, supporting long and short range communication protocols, and secure and unsecure communication.

In various embodiments, the payment processing entity 125 may determine that computing device 105 is in proximity to the payment processing entity 125 and provide an indication to the computing device 105 in a message or communication via the contactless communication network 135. The information may indicate that the payment processing entity 125 is in proximity and is ready for processing a transaction over the contactless communication link 125. In some embodiments, the computing device 105 may determine that the payment processing entity 125 is in proximity to the computing device 105 and may transmit an availability indication in a message or communication to the payment processing entity 125 over the contactless communication link 135.

In various embodiments, the computing device 105 and payment processing entity 125 may determine proximity using various means. For example, the computing device 105 and the payment processing entity 125 may include one or more proximity sensors, such as an infrared proximity sensor, an acoustic proximity sensor, a magnetic proximity sensor, a capacitive proximity sensor, an electromagnetic proximity, a photo electronic proximity sensor, or the like. In various embodiments, the computing device 105 may receive a request for payment for a transaction from the payment processing entity 125 over the contactless communication link 135. The request for payment may include information for the transaction including a purchase price, goods or service being purchased, amount or quantity of goods or services being purchased, etc. For example, a user may pump gas at a gas station and the computing device 105 may receive a request for payment from the payment processing entity 125. The request for payment may include the total price for the gas and the amount of gas purchased. In another example, a person may be at a toll booth and receive a request for payment of the toll. In this case, the request for payment may include the amount for the toll and a total mileage travelled since the last toll was paid. Various embodiments are not limited in this manner and the request for payment may include other information related to the transaction.

In various embodiments, the computing device 105 may provide or transmit payment information to the payment processing entity 125 over the contactless communication link 135. As discussed above, the payment information may include any information related to payment for the transaction. For example, the payment information may include a name, an account number, a credit card number, a billing address, an expiration date, a credit card security code, a card verification number, a credit card type, an account type, a username and password, and any other information related to the payment account. The payment processing entity 125 may communicate with one or more entities to process the transaction using the payment information. For example, the payment processing entity 125 may communicate with a credit card processing entity (not shown) to process the transaction.

The computing device 105 may receive a receipt for the transaction from the payment processing entity 125 once the transaction is complete or a failure has occurred. The receipt may indicate that the transaction has been approved and completed or that the payment of transaction has failed. In various embodiments, the payment processing entity 125 may transmit an electronic version of a receipt to the computing device 105 over the contactless communication link 135. However, in various embodiments, the payment processing entity 125 may print out a paper version of the receipt from a printing station.

In various embodiments, the communication network 100 may include a mobile device 130. Mobile device 130 may be a personal digital assistant, a mobile computing device, a smart phone, a cellular telephone, a handset, a one-way pager, a two-way pager, a messaging device, a computer, a laptop computer, a notebook computer, a handheld computer, a tablet computer, a network appliance, a web appliance, multiprocessor systems, processor-based systems, or any combination thereof. The embodiments are not limited in this context.

In some embodiments, computing device 105 may be controlled or managed via the mobile device 130. Moreover, the mobile device 130 may be used to authenticate a transaction, receive a receipt for a transaction, or to add, delete or modify a payment account, payment information and payment settings. For example, the computing device 105 may transmit or provide information to the mobile device 130 to notify a user that the computing device 105 has received a request for payment and a user may use the mobile device 130 to authenticate the request by entering authentication information via an input device on the mobile device, such as a keypad, number pad, microphone, touchscreen display, etc. The authentication may be transmitted to the computing device 105 via the mobile communication link 140 and the computing device 105 may then transmit payment information to the payment processing entity 125 via the contactless connection 135 based on the outcome of the authentication procedure. Upon completion of the transaction, the mobile device 130 may receive a receipt for the transaction from the computing device 105 via the mobile communication link 140 and display the receipt on a display of the mobile device 130.

In some embodiments, a payment account on the computing device 105 may be activated by the mobile device 130. The mobile device 130 may receive account and activation information from the computing device 105 and communicate with an activation entity (not shown) or the electronic wallet cloud services provider 115 to activate the account.

In various embodiments, the mobile device 130 may be used to add, delete or modify a payment account, payment information and payment settings. For example, the mobile device 130 may transmit a new payment account including payment information and payments settings to the computing device 105 via the mobile communication link 140. In another example, the mobile device 130 may access the payment account, payment information and payment settings on the computing device 105 via the mobile device connection 140 to modify an existing payment account, payment information and payment settings.

Figure 2:
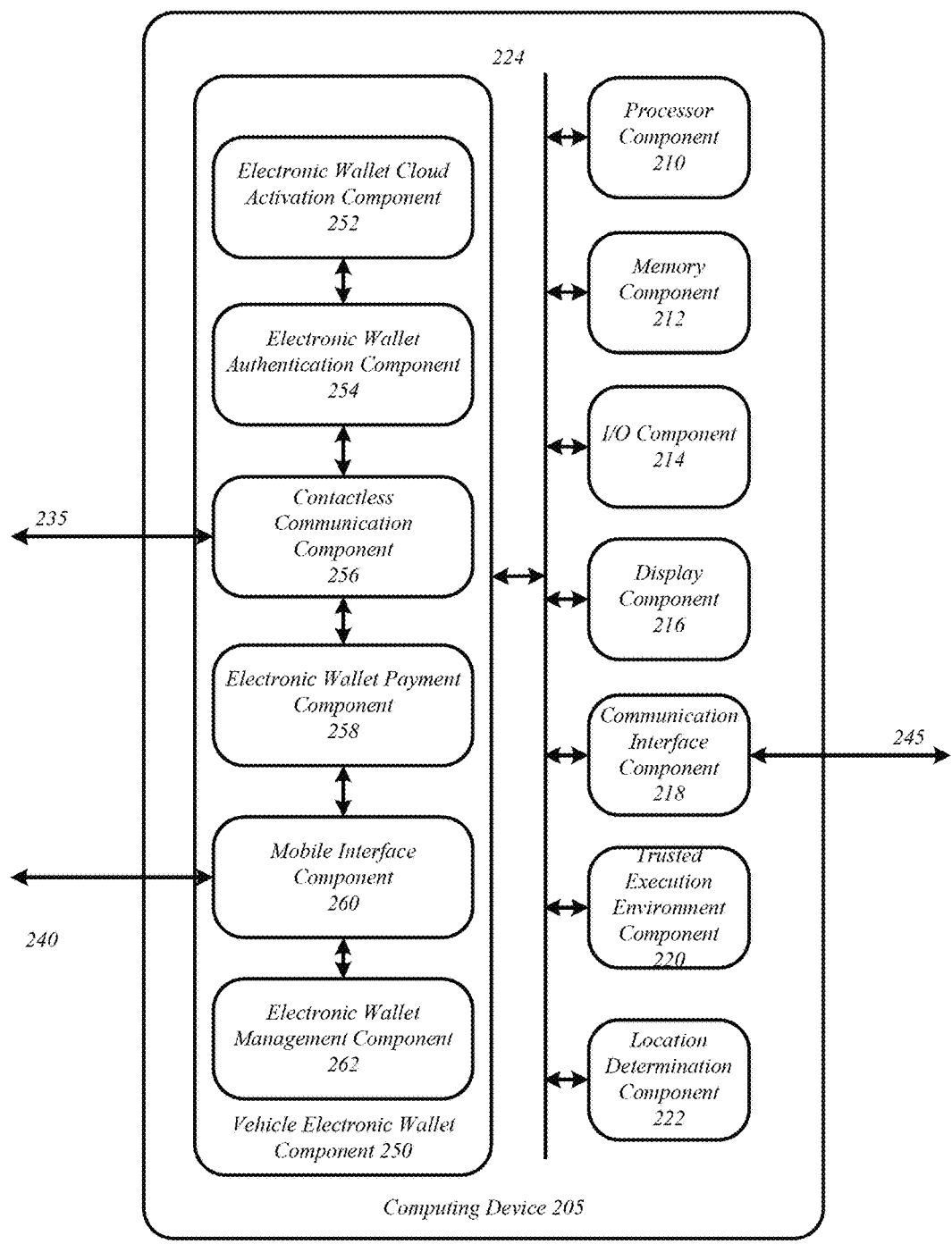
FIG. 2 illustrates an embodiment of a second in-vehicle electronic wallet system.

In various embodiments, the computing device 105 may include a mobile application to install or provide to the mobile device 130 to interface with. The application may be pushed to the mobile device 130 from the computing device 105 via the mobile communication link 140. The application may be installed onto the mobile device 130 and provide an interface between the computing device 105 and the mobile 130. The application may provide a graphical user interface (GUI) for a user to interface with to control or manage the computing device 105. FIG. 2 illustrates one embodiment of a computing system, in particular, computing device 205 for the in-vehicle electronic wallet system. In various embodiments, computing device 205 may be representative of a computing system suitable for use with one or more embodiments described herein, such as, system 100 of FIG. 1, signaling 300 of FIG. 3, logic flow 400 of FIG. 4, logic flow 500 of FIG. 5, and/or system 600 of FIG. 6. Computing device 205 may be similar to or the same as computing device 105 as discussed above. The embodiments are not limited in this respect.

As shown in FIG. 2, computing device 205 may include multiple elements. One or more elements may be implemented using one or more circuits, components, registers, processors, software subroutine modules, or any combination thereof, as desired for a given set of design or performance constraints. Although FIG. 2 shows a limited number of elements in a certain topology by way of example, it can be appreciated that more or less elements in any suitable topology may be used in computing device 205 as desired for a given implementation. The embodiments are not limited in this context.

In various embodiments, computing device 205 may include a processor component 210. Processor component 210 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processor component 210 may be connected to and communicate with the other elements and components of the computing system via an interconnect 224, such as one or more buses, control lines, and data lines.

In one embodiment, computing device 205 may include a memory component 212 to couple to processor component 210. In various embodiments, the memory component 212 may store data and information for the in-vehicle electronic wallet. For example, the memory component 212 may store and maintain one or more payment accounts, payment information, payment settings and loyalty account information. The memory component 212 may also store other information and data, such as a driver's license data, medical card data, gift card data, etc.

Memory component 212 may be coupled to processor component 210 via interconnect 224, or by a dedicated communications bus between processor component 210 and memory component 212, as desired for a given implementation. Memory component 212 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory component 212 can store instructions and data momentarily, temporarily, or permanently. The memory component 212 may also store temporary variables or other intermediate information while the processor component 210 is executing instructions. The memory component 212 is not limited to storing the above discussed data and may store any type of data.

The computing device 205 may include input/output (I/O) component 214 having at least one of an input device, such as one or more buttons, a keyboard, a keypad, a touchscreen display, a touch sensitive device, a microphone, a biometric finger printer reader, biometric eye scanner or any other device used for inputting information into computing device 205. The I/O component 214 may be used to input any information or data into the computing device 205. For example, the I/O component 214 may be used to input authentication data such as a password, passcode, voice passphrase, finger print, etc. The I/O component 214 may also be used to input any type of data or information including a payment account, payment information, payment settings, loyalty data, driver's license data, medical data, etc.

In various embodiments, the I/O component 214 may include one or more components to output information to a user. For example, the I/O component 214 may include a speaker to output an audible noise or a haptic feedback device to output a vibration. In various embodiments, the I/O component 214 may be used to prompt the user to enter authentication information or indicate that a request for payment has been received, for example.

In one or more embodiments, the I/O component 214 may be located within or on the vehicle. For example, the I/O component 214 may be one or more input devices and output devices integrated into the dashboard, center console, glove box, steering wheel, head rest, and so forth. In another example, the I/O component 214 may be located on the vehicle, such as, on the fuel cap or fuel door.

In embodiments, the computing device 205 may include a display component 216. Display component 216 may constitute any display device capable of displaying information received from processor component 210. The display component 216 may include at least one of a Liquid Crystal Display (LCD), a Thin Film Transistor-LCD (TFT-LCD), an Organic Light Emitting Diode (OLED), a flexible display, a three-dimensional (3D) display and a projector, for example. The display component 216 may display a User interface (UI) or a Graphical User Interface (GUI) associated with controlling functionality of the computing device 205. The computer device may include two or more display units, according to various embodiments.

The display component 216 may display any information or data associated with the in-vehicle electronic wallet system. For example, the display component 216 may display information relating to the request for payment received from the payment processing entity 125. In another example, the display component 216 may display the receipt for a transaction. In a third example, the display component 216 may display information associated with one or more payment accounts, payment information and payment settings. The display component 216 is not limited in this manner and may display any information including navigation information, location information, commerce information, infotainment information, etc. In one or more embodiments, the display component 216 may be located anywhere within or on the vehicle. For example, the display component 216 integrated into the dashboard, center console, glove box, steering wheel, head rest, and so forth.

In embodiments, the computing device 205 may include a communication interface component 218. The communication interface component 218 includes any device and circuitry for processing information or communications over wireless and wired connections. For example, the communication interface component 218 may include a receiver, a transmitter, one or more antennas, and one or more Ethernet connections. The specific design and implementation of the communication interface component 218 may be dependent upon the communications network in which the computing device 205 is intended to operate. In some embodiments, the computing device 205 may be designed to operate in a plurality of communications networks and is not limited to a specific network.

In various embodiments, the communication interface component 218 may include one or more I/O controllers (not shown) to receive and output any signals and information. The I/O controller may enable communication over wireless and wired connections. In various embodiments, the I/O controller may be separate component or module of computing device 205.

The communication interface component 218 may enable the computing device 205 to communicate over one or more links including network communication link 245. Network communication link 245 may be similar or the same as network communication link 145, as discussed above. For example, the communication interface component 218 may enable the computing device 205 to communicate information with the electronic wallet cloud services provider 115 over network communication link 245. The information may be any data or information relating to the electronic wallet, a transaction including a payment account, payment information and payment settings. In various embodiments, communication interface component 218 is not limited to communicating over network communication link 145 and may communicate over any communication link.

In one or more embodiments, the computing device 205 includes a trusted execution environment component 220 to enable secure execution of processing information and secure communication of information. The trusted execution environment component 220 may include one or more apparatuses, devices, servers, databases, systems, logic and circuitry for secure processing and communication. The trusted execution environment component 220 ensures that sensitive data is stored, processed and protected in a trusted environment. For example, the trusted execution environment component 220 may store one or more payment accounts, payment information and payment settings in a secure location. In another example, the trusted execution environment component 220 may enable secure communication of sensitive data over the communication links by utilizing various encryption techniques.

In various embodiments, the trusted execution environment component 220 may be a standalone component.

However, in some embodiments, the trusted execution environment component 220 may be included in or part of other components of the computing system 105 such as the processor component 210 and/or memory component 212. In some embodiments, the trusted execution environment component 220 may be an isolated environment that runs in parallel with an operating system or controller software, providing security services to the operating environment.

The computing device 205 may include a location determination component 222. The location determination component 222 may include one or more apparatuses, devices, servers, databases, systems, logic and circuitry to determine the location of the computing device 205. The location determination component 222 may use various location determination techniques including Time Difference on Arrival (TDOA) (including Uplink-TDOA (U-TDOA), Observed TDOA (OTDOA), Ideal Period Downlink-OTDOA (IPDL-OTDOA), and other TDOA procedures), use of a Global Positioning System (GPS), use of an Assisted Global Positioning System (AGPS), Emergency intersystem Handoff (EISHO), Round Trip Time (RTT) measurements, Enhanced Observed Time Difference (E-OTD), triangulation, and/or the like. These location determination techniques may determine or estimate the location of a mobile device according to an identifier of a cell, femtocell, picocell, access point, base station, Node-B, eNode-B, cell site, and/or other network component or network that is accessible to the mobile device. Suitable identifiers include an Internet Protocol (IP) address, a Cell Global Identity (CGI), an Enhanced Cell Global Identity (E-CGI), a Media Access Control (MAC) address, a Service Set Identifier (SSID), an International Mobile Subscriber Identity (IMSI), an International Mobile Equipment Identity (IMEI), a serial number, and/or the like.

In some embodiments, computing device 205 includes a vehicle electronic wallet component 250 for electronic wallet processing. The vehicle electronic wallet component 250 includes one or components for authentication, authorization, management and communication of electronic wallet features. In various embodiments, the vehicle electronic wallet component 250 includes an electronic wallet cloud activation component 252, an electronic wallet authentication component 254, a contactless communication component 256, an electronic wallet payment component 258, a mobile interface component 260 and an electronic wallet management component 262. FIG. 2 illustrates the vehicle electronic wallet component 250 having a limited number of components. However, various embodiments are not limited in this manner, the vehicle electronic wallet component 250 may have any number of components to provide electronic wallet functionality.

The vehicle electronic wallet component 250 may include an electronic wallet cloud activation component 252 to activate one or more payment accounts. The electronic wallet cloud activation component 252 may communicate with an activation entity (not shown) or the electronic wallet cloud services provider 115 to active the one or more payment account for the computing device 205. The payment accounts may be activated through the cloud via one or more communication links, such the communications links described in FIG. 1.

In various embodiments, the electronic wallet cloud activation component 252 may receive information including payment information and payment settings for a payment account for use during activation. The electronic wallet cloud activation component 252 may also require additional information for activation, such as the vehicle identification number (VIN) and user details, e.g. user's name and credentials. The electronic wallet cloud activation component 252 may receive this information via accessing stored data in the memory component 212, user input, or from the electronic wallet cloud services provider 115. In addition, the information may be stored in the memory component 212 as a factory default setting or by a user entering information.

In one or more embodiments, the electronic wallet cloud activation component 252 may use the information to activate one or more payment accounts. For example, the electronic wallet cloud activation component 252 may transmit information including the VIN, user details, and payment account information to the electronic wallet cloud services provider 115 via network communication link 145 to activate the one or more payment accounts. Once activated the payment account may be associated with a user and a particular vehicle based on the VIN. In various embodiments, if the payment account was successfully activated the account will then be ready for use during a transaction.

In some embodiments, the electronic wallet cloud activation component 252 may activate one or more accounts using a different means. For example, the electronic wallet cloud activation component 252 may activate a payment account connecting to an activation server (not shown) through a mobile device 130 via the mobile communication link 140. Various embodiments are not limited in this manner, the electronic wallet cloud activation component 252 may activate one or more payment accounts in any manner.

The electronic wallet cloud activation component 252 may also activate other accounts for use, such as a driver license account or a loyalty card account. The electronic wallet cloud activation component 252 may communicate with one or more servers, devices, apparatuses through any communication link to activate these other accounts for use. For example, the electronic wallet cloud activation component 252 may communicate with a department of motor vehicle server (not shown) to activate a driver license for use. In another example, the electronic wallet cloud activation component 252 may communicate with one or more servers of a retailer or store to activate a loyalty card account. However, various embodiments are not limited in this manner, any account may be activated over any communication link.

In some embodiments, the vehicle electronic wallet component 250 includes an electronic wallet authentication component 254 to authenticate a transaction. A user may authenticate a transaction via entering authentication information using the I/O component 214, for example. The authentication information may be a personal identification number (PIN) entered on a number pad, a password entered on a touch screen display, a pass phrase spoken into a microphone or a fingerprint entered using a biometric sensor. In another embodiment or the same embodiment, a user may be able to authenticate transaction using a mobile device 130 connected with the electronic wallet authentication component 254 via the mobile communication link 240. For example, as previously described, a user may use a input device of the mobile device 130 to authenticate a transaction, and the electronic wallet authentication component 254 may receive authentication information from the mobile device 130 to use for authentication.

In various embodiments, the electronic wallet authentication component 254 may receive a request for payment via a communications link and prompt a user to authenticate the transaction. For example, the electronic wallet authentication component 254 may receive a request for payment from the payment processing entity 125 and may prompt a user via an audible or visual notification. In other embodiments, the electronic wallet authentication component 254 may prompt the user by haptic feedback, such as vibrating the steering wheel. The electronic wallet authentication component 254 may prompt a user to authenticate a transaction in any manner including utilizing an audible, a visual or haptic feedback.

The electronic wallet authentication component 254 may receive authentication information and a transaction may be authenticated based on a comparison between the authentication information and stored authentication information. Stored authentication information may be a PIN, a password, a voice pass phrase, or a biometric characteristic. A user may enter stored authentication information during a registration process. The electronic wallet authentication component 254 may enable payment of a transaction based on whether the transaction is authenticated or not authenticated. For example, as will be discussed in more detail below, the electronic wallet authentication component 254 may send payment information to the electronic wallet payment component 258 via one or more interconnects for payment of the transaction. The vehicle electronic wallet component 250 may include a contactless communication component 256 to communicate over a communication link such as the contactless communication link 245. In various embodiments, the contactless communication component 256 may include one or more apparatuses, devices, servers, databases, systems, logic and circuitry to communicate information. In various embodiments, the contactless communication link 235 may be a secure communication using various encryption methods to prevent data or information from being compromised. The contactless communication component 256 may include various hardware and software to enable communication in accordance with different types of shorter range wireless systems and long range wireless systems.

In various embodiments, the contactless communication component 256 may communicate information between the computing device 205 and a payment processing entity 125. For example, the contactless communication component 256 may receive a request for payment via the contactless communication link 235 from the payment processing entity 125. The contactless communication 256 may also transmit information including payment information to the payment processing entity 125 to pay for the transaction. Various embodiments are not limited in this manner and the contactless communication component 256 may communicate any information with any server, device, apparatus, etc.

The contactless communication component 256 may receive and transmit information when the vehicle 120 and computing device 205 are in proximity to the payment processing entity 125. In various embodiments, the distance between the vehicle 120 and the payment processing entity 125 before a connection occurs may be dictated by the capabilities of the communication system. For example, the contactless communication component 256 and computing device 205 may have to be within a few feet of the payment processing entity 125 when communicating over a BLUETOOTH® connection. In another example, the contactless communication component 256 and computing device 205 may have to be within a few inches or centimeters of the payment processing entity 125 when communicating over a near field communication.

The contactless communication component 256 may communicate while the vehicle is in motion or when the vehicle is not in motion. For example, the contactless communication component 256 may communicate with a payment processing entity 125 such as a gas pump while the vehicle is parked next to the gas pump and with a toll booth while the car is in motion.

In various embodiments, the vehicle electronic wallet component 250 includes an electronic wallet payment component 258 to enable payment of a transaction. The electronic wallet payment component 258 may transmit payment information corresponding to a payment account over a communication link for payment of a transaction. The payment information may be transmitted based on whether the transaction has been authenticated or not authenticated. For example, the electronic wallet payment component 258 may receive information from the electronic wallet authentication component 254 indicating that the transaction has been authenticated. The electronic wallet payment component 258 may then transmit payment information for a payment account to a payment processing entity 125 for payment of the transaction via contactless communication link 235. However, if the transaction has not been authenticated, then the electronic wallet payment component 254 will not transmit payment information.

In some embodiments, the electronic wallet payment component 258 may transmit loyalty information with the payment information to the payment processing entity 125. For example, a particular retailer or gas station may have "fuel perks" that a user may use to pay for or add to a transaction. Various embodiments are not limited in this manner.

In one or more embodiments, the vehicle electronic wallet component 250 may include a mobile interface component 260 to communicate over a communication link such as the mobile communication link 240. The mobile interface component 260 may communicate information with one or more mobile devices, such as mobile device 130. In various embodiments, the mobile communication link 240 may be similar to or the same mobile communication link 140. In various embodiments, the mobile communication link 240 may be a secure communication using various encryption methods to prevent data or information from being compromised. In some embodiments, the mobile device 130 may communicate with the computing device 205 via a direct connection between the mobile device 130 and the computing device 105 or through one or more intermediary devices. In various embodiments, the one or more intermediary devices may be an in-vehicle navigation system or an in-vehicle infotainment system.

The vehicle electronic wallet component 250 includes an electronic wallet management component 262 to control and manage various aspects of the vehicle electronic wallet component 250. In various embodiments, the electronic wallet management component 262 may manage one or more, user accounts, payment accounts, payment information, payment settings, user details, loyalty information, etc. Moreover, the electronic wallet management component 262 may coordinate and manage communication and information received and sent via cloud services.

In one or more embodiments, the electronic wallet management component 262 may be used to communicate information to and from the electronic wallet cloud services provider 115 over one or more network communication links. The information communicated between the electronic wallet management component 262 and the electronic wallet cloud services provider 115 may be used to add, delete or modify one or more payment accounts, payment information, payment settings, loyalty information, transaction history, etc. The information may be communicated to change a policy for a payment setting or access a transaction history, for example. In addition, the electronic wallet management component 262 may communicate information with the electronic wallet cloud services provider 115 to store the information at the electronic wallet cloud services provider 115 or some other remote storage location.

In some embodiments, the electronic wallet management component 262 may receive information from the electronic wallet cloud services provider 115 including information to add a new account, information to delete an account, information to modify an account, etc. Various embodiments are not limited in this manner and the electronic wallet management component 262 may manage and communicate any information relating to the vehicle electronic wallet component 250.

In some embodiments, the electronic wallet management component 262 may receive information not from the electronic wallet cloud services provider 115, but via the I/O component 214. For example, the wallet management component 262 may receive information to add, delete, or modify one or more payment accounts including payment information and payment settings from a user via the I/O component 214. In another example, the wallet management component 262 may receive user details including a name, address, phone number, authentication information, and electronic mail address for use with the vehicle electronic wallet component 250 via the I/O component 214.

In various embodiments, the electronic wallet management component 262 may receive a user selection to enable one of a plurality of payment accounts for payment of a transaction. For example, the electronic wallet management component 262 may receive a selection for one of the payment accounts from the electronic wallet cloud services provider or the I/O component 214. The electronic wallet management component 262 may receive the user selection 262 and save the selection in the memory component 212. Various embodiments are not limited in this manner and the electronic wallet management component 262 may manage various other aspect of the electronic wallet.

The computing device 205 is not required to sync with the electronic wallet cloud services provider 115 all the time. In some embodiments, the computing device 205 may not always have a connection with the electronic wallet cloud services provider 115. Thus, the computing device 205 via the electronic wallet management component 262 may transmit and receive information with the electronic wallet cloud services provider 115 when a connection is available. For example, the electronic wallet management component 262 may sync with electronic wallet cloud services provider 115 when the vehicle is at home and can access a home access point. In another example, the electronic wallet management component 26 may sync with the electronic wallet cloud services provider 115 via the mobile device 130 when a tether or connection is made between the computing device 205 and the mobile device 105. Various embodiments are not limited in this manner and the computing device 205 may sync with the electronic wallet cloud services provider 115 when any connection is available.

In one or more embodiments, the electronic wallet management component 262 may send information to the to the electronic wallet cloud services provider 115, such as, payment account information, payment information, payment settings, loyalty accounting information, etc. For example, as previously discussed, a user may add, delete or modify a payment account locally on the computing device 105 or via the mobile device 130. The computing device 105 may then send information to add a new account, information to delete an account, or information to modify an account to the electronic wallet cloud service provider 115.

The electronic wallet management component 262 may also manage user account information. In particular, the electronic wallet management component 262 may enable a user to create or manage one or more user profiles for the computing device 205. The one or more user profiles may be associated with a particular user and may be activated to use during a transaction. For example, a particular user may be the driver the vehicle and may activate their user profile by enter a password or pass phrase to enable one or more payment accounts for use during a transaction.

In some embodiments, each user may create and associate a user profile via the computing device 205, through the mobile device 130, or via another connection (home computer) with the electronic wallet cloud services provider 115. For example, a particular user may setup a user account by entering user information, such as a name and password, and payment account information into the computing device 205 and this information may be sent to the electronic wallet cloud services provider 115 to store as a particular user account for use. However, various embodiments are not limited in this manner and the one or more user accounts and information may be store locally on the computing device 105.

Figure 3:
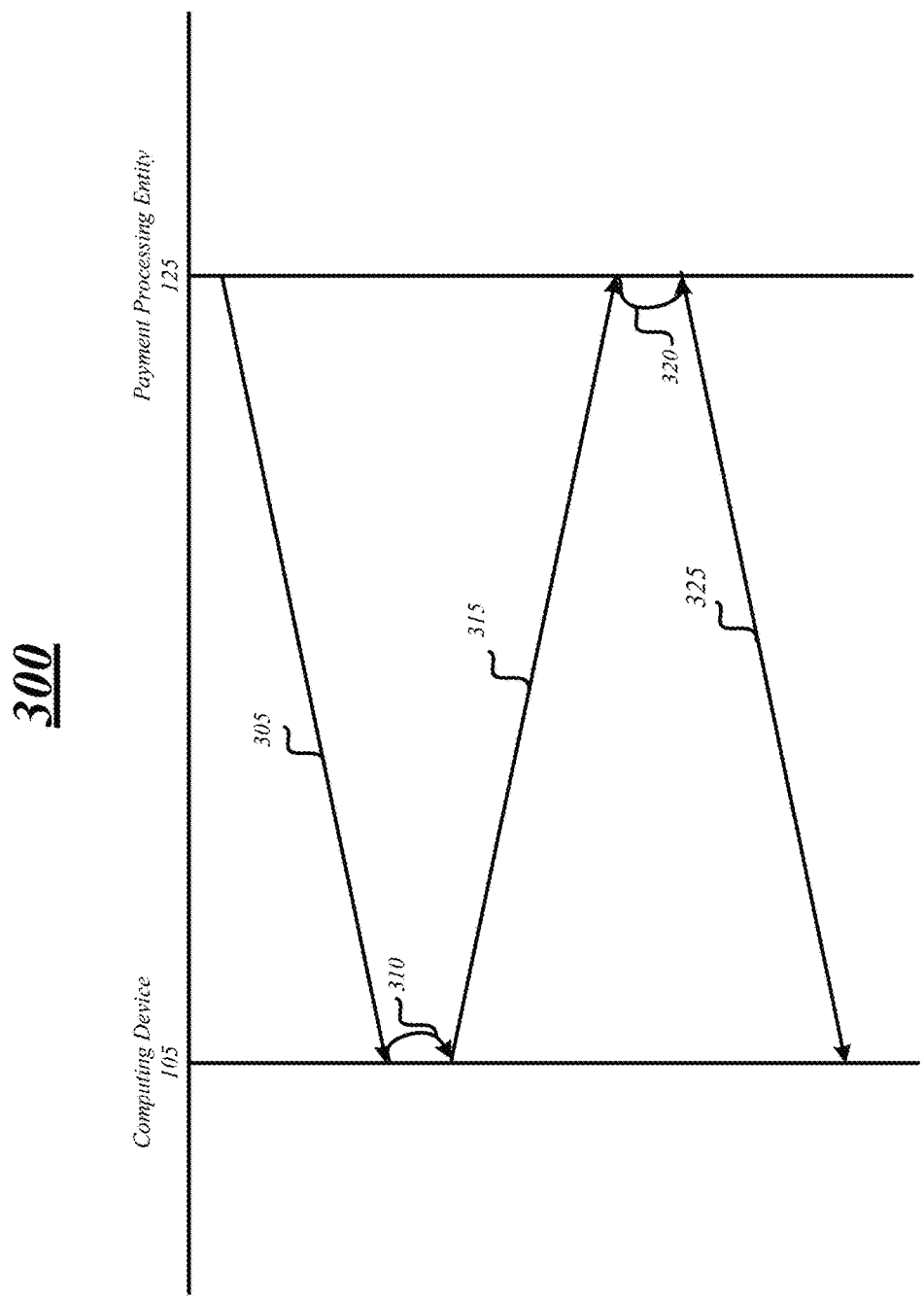
FIG. 3 illustrates an embodiment of a first signal diagram for an in-vehicle electronic wallet system.

FIG. 3 illustrates an embodiment of a first signal diagram for the in-vehicle electronic wallet for processing a transaction. At line 305 the computing device 105 may receive a request for payment for a transaction over a contactless communication interface when a vehicle is in proximity to a payment processing entity 125. The request for payment may include information relating to the transaction including, but not limited, the price and quantity of the goods or service being purchased. At line 310, the computing device 105 may prompt a user to authenticate the transaction with an audible, visual, or haptic prompt. A user may enter authentication information including a password, pass phrase, fingerprint via one or more inputs or through a mobile device to authenticate the transaction.

At line 315, payment information is sent to the payment processing entity 125 if the user authenticates the request for payment. The payment information may include a name, an account or credit card number, an expiration date, and a card security code for payment of the transaction. The payment processing entity 125 receives the payment information via one or more communication links such as a contactless communication link, and at line 320 processes payment for the transaction. During processing of payment for the transaction, the payment processing entity 125 may communicate with one or more third party servers (not shown) to process the payment.

At line 325, the computing device 105 may receive a receipt for the transaction over the contactless communication link 135 from the payment processing entity 125. The computing device 105 receives the receipt and may display the receipt on a display, such as display component 216. At this point payment and processing of the transaction may be complete. The computing device 105 may receive an indication that transaction processing has failed if the processing was unsuccessful.

Figure 4:
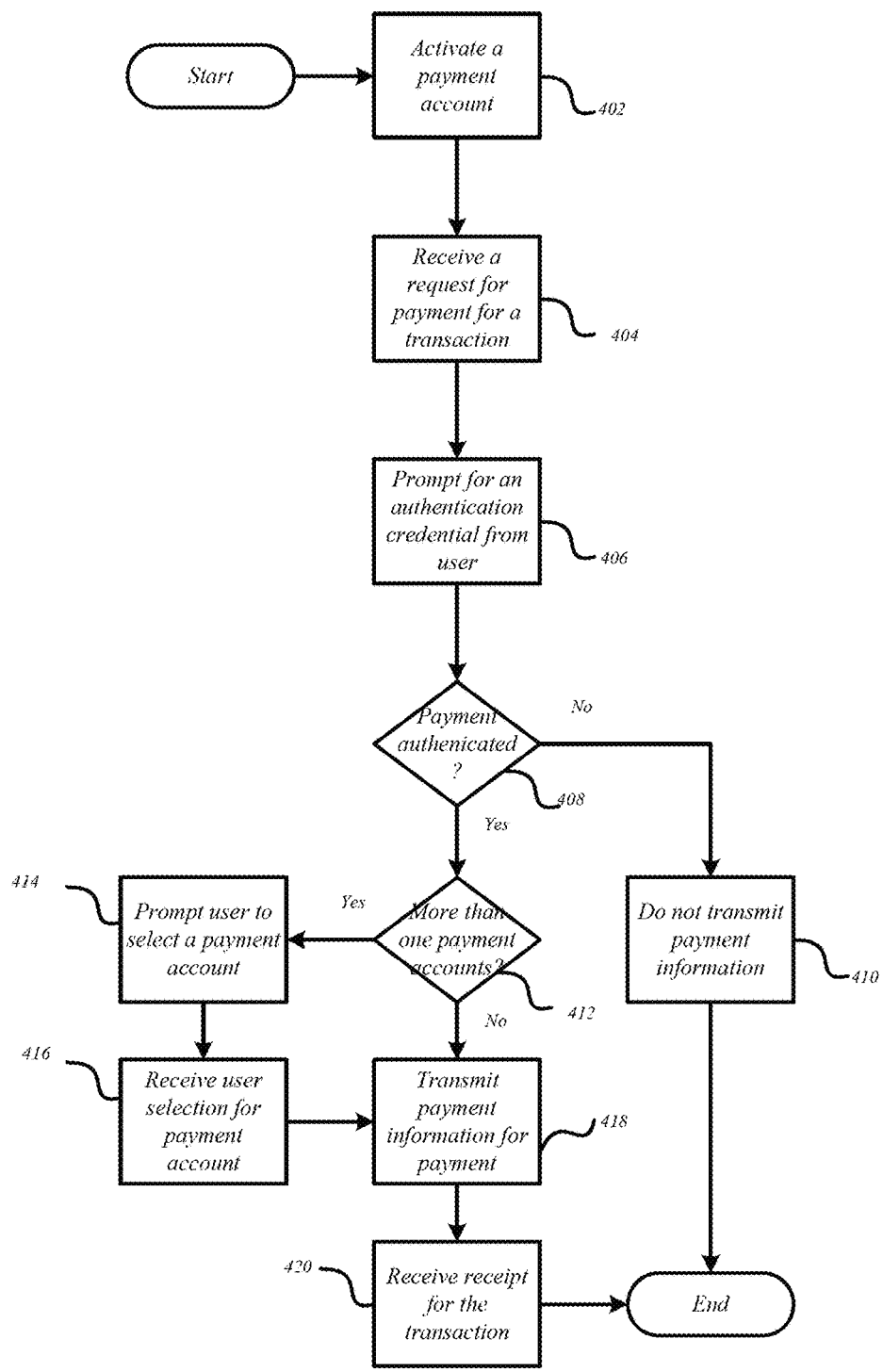
FIG. 4 illustrates an embodiment of a first logic flow diagram for an in-vehicle electronic wallet system.

FIG. 4 includes a logic flow diagram 400 illustrating one example of electronic wallet processing and control thereof in some embodiments. At block 402, a payment account may be activated by transmitting payment account, payment information, payment settings, a vehicle identification number and user details to an activation entity or the electronic wallet cloud services provider 115. In various embodiments, more than one payment account may be activated for an electronic wallet. The computing device 105 may receive a confirmation that the payment account is activated and ready for use in processing a transaction or the activation attempt has failed. Once activated, the payment account is associated with the vehicle based on the vehicle identification number.

At block 404, a request for payment for a transaction may be received over a contactless communication interface 135 when a vehicle is in proximity to a payment processing entity 125 and the computing system 105 attempts to purchase a product or service. The request for payment may include information relating to the transaction including, but not limited to, the price and quantity of the goods or service being purchased.

In some embodiments, at block 406, a prompt may be generated for a user to input to authentication information for a transaction. The transaction may be authenticated by having a user input the authentication information and comparing the authentication information to stored authentication information. At decision block 408, if the authentication information matches the stored authentication information, the user is authenticated and the transaction may be processed. However, if the authentication information does not match the stored authentication information, the user is not authenticated and transaction processing ends. Moreover, if the user is not authenticated, payment information is not sent at block 410.

At decision block 412, a determination is made as to whether more than one payment account is activated on the computing device 105. If more than one payment account is activated a user may be prompted to enter a selection for payment at block 414. For example, the display component 216 may display a list of all the activated payment accounts on the display and the user may select one of the payment accounts. At block 416, the computing device 105 may receive an input via the I/O component 214 from the user for selection of the payment account. In some embodiments, if more than one payment account is activated, the computing device 105 will not prompt the user to enter a selection for a payment account and a default payment account will be used. For example, if the location determination device 222 determines that the vehicle is in motion, the computing device 105 may not prompt the user to make a selection and may use a default payment account. A user may select a default payment account as a payment setting during a configuration process.

At block 418, payment information may be transmitted to a payment processing entity 125. The payment information may be associated with the selected payment account, the default payment account or if there is only a single payment account, the single payment account. The payment information may be sent to the payment processing entity 125 via the contactless communication link 135, as previously discussed. At block 420, the computing device 105 may receive a receipt for the transaction via the contactless communication link and may display the receipt on the display device 216. In various embodiments, the receipt may also be transmitted from the computing device 105 to a mobile device 130 over mobile communication link 140 for displaying on the display of the mobile device 130. In various embodiments, blocks 402-420 may be repeated to process a transaction. In some embodiments, a user may not have to activate a payment account if a payment account is already activated on the computing device to process a transaction.

Figure 5:
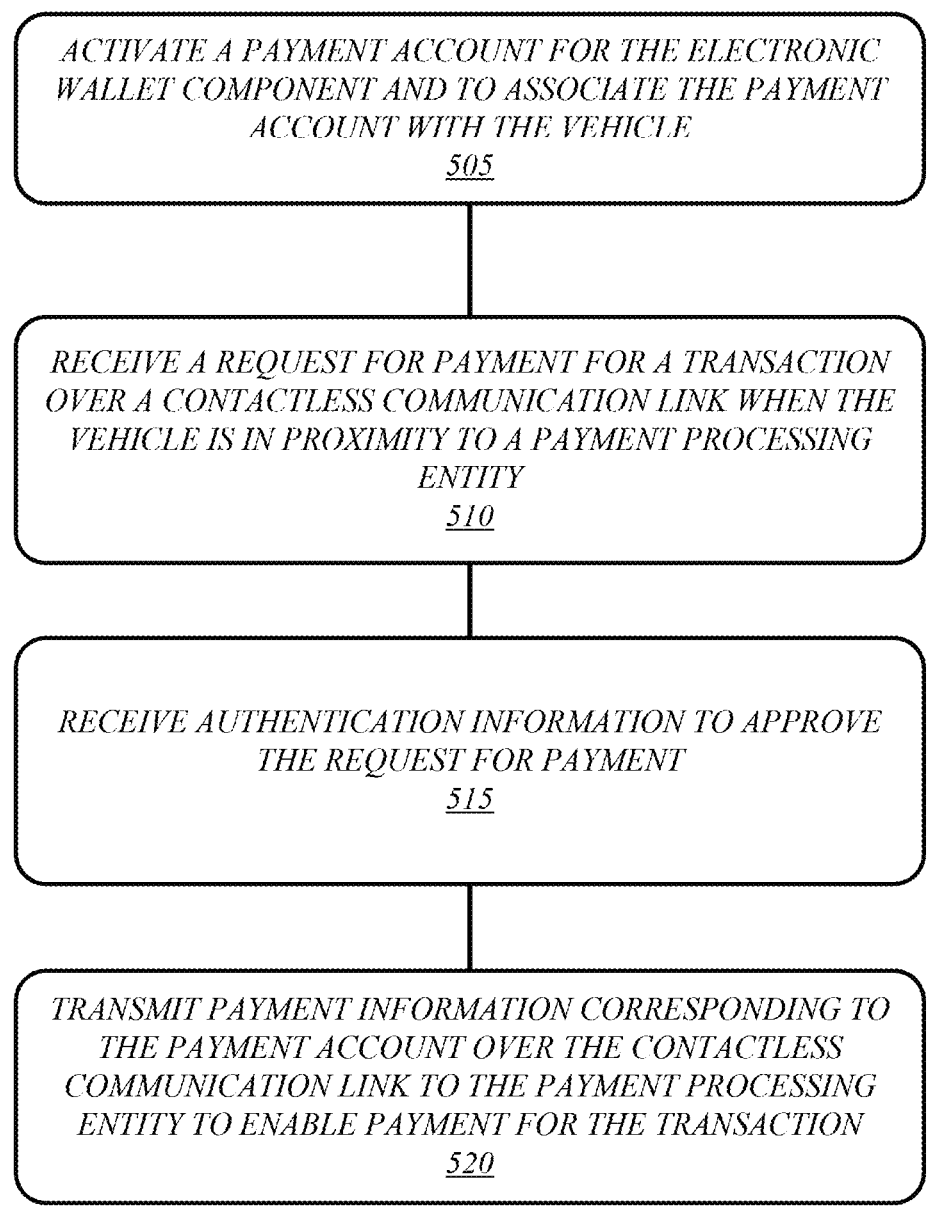
FIG. 5 illustrates an embodiment of a second logic flow diagram for an in-vehicle electronic wallet system.

FIG. 5 illustrates an embodiment of a second logic flow 500. The logic flow 500 may be representative of some or all of the operations executed by one or more embodiments described herein. For example, the logic flow 500 may illustrate operations performed by the system 100 and, more particularly, computing device 105 of system 100. In the illustrated embodiment shown in FIG. 5, the logic flow 500 may include activating a payment account for the vehicle electronic wallet component 250 and to associate the payment account with the vehicle at block 505. As previously discussed, a payment account may be activated by transmitting information including a VIN and authentication information to an electronic wallet cloud services provider and receiving a confirmation that the payment account is activated. At block 510, the logic flow may include receiving a request for payment for a transaction over a contactless communication link when the vehicle is in proximity to a payment processing entity. The request for payment may include information such as the a price and a quantity for the transaction.

At bock 515, in some embodiments, the logic flow may include receiving authentication information to approve the request for payment. The authentication information may be received via an I/O component located within the vehicle or coupled with the vehicle and include a password, personal identification number, a pass phrase, and/or a biometric input. If the payment for the transaction has been approved, the logic flow may include transmitting payment information corresponding to the payment account over the contactless communication link to the payment processing entity to enable payment for the transaction at block 520. The payment information may include a name, an account number, an expiration date, and a card security code. Other information may also be transmitted such as loyalty card information, payment settings and user details.

Figure 6A:
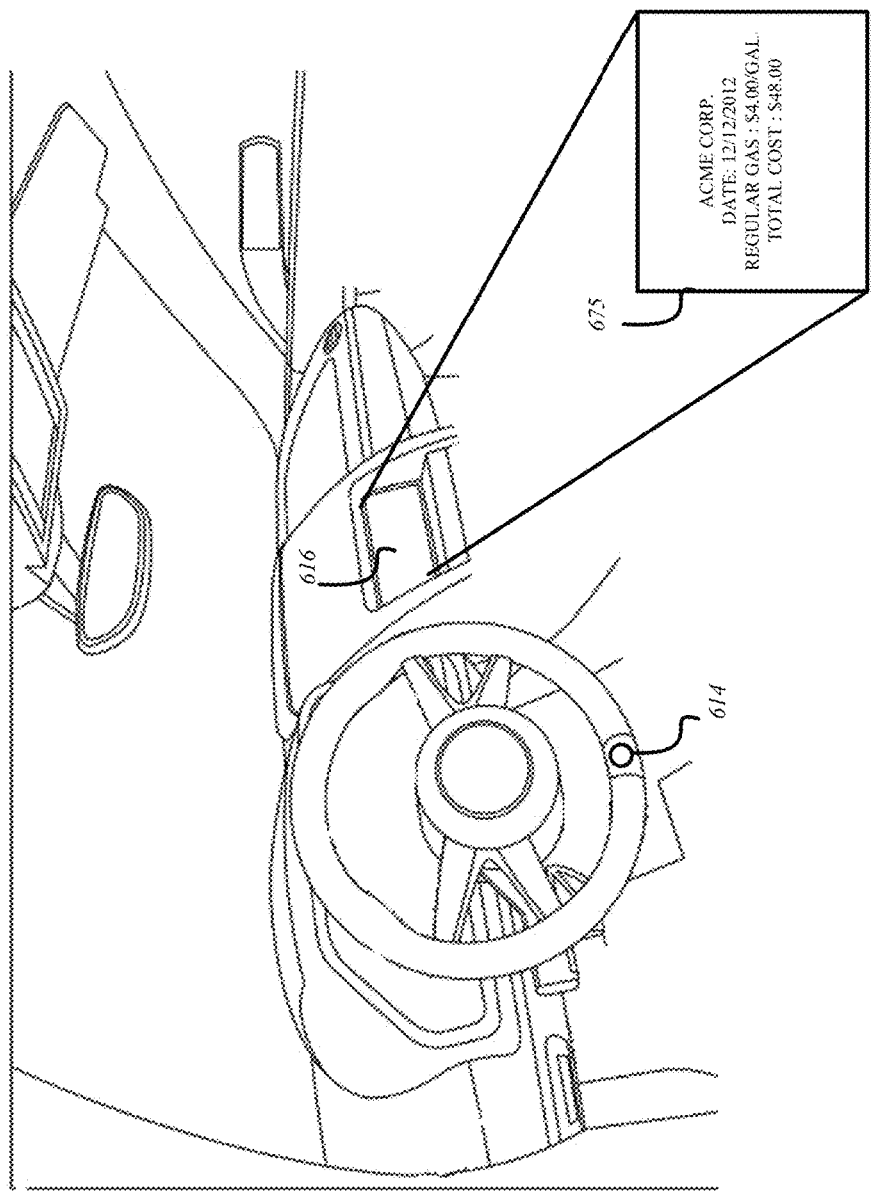
FIG. 6A illustrates an embodiment of a third in-vehicle electronic wallet system configuration.

FIG. 6A illustrates an embodiment of an exemplary in-vehicle electronic wallet system configuration. System configuration 625 illustrates one configuration of an I/O component 614 and a display component 616 located within and integrated into a vehicle.

In various embodiments, I/O component 614 may be located on and integrated with a steering wheel or portion thereof. I/O component 614 may be similar to or the same as I/O component 214. The I/O component 614 may include one or more buttons, a keyboard, a keypad, a touchscreen display, a touch sensitive device, a microphone, a biometric finger printer reader, biometric eye scanner or any other device used for inputting information. The I/O component 614 may be used to input any information or data into the computing device 105. For example, the I/O component 614 may be used to input authentication data such as authentication information such as a password, passcode, voice passphrase, finger print, etc. The I/O component 614 may also be used to input any type of data or information including a payment account, payment information, payment settings, loyalty data, driver's license data, medical data, etc.

In some embodiments, the I/O component 614 may include one or more components to output information to a user. For example, the I/O component 614 may include a speaker to output an audible noise. The I/O component 614 may also include a haptic feedback device to output a vibration. In various embodiments, the I/O component 614 may be used to prompt the user to enter authentication information or indicate that a request for payment has been received, for example. Various embodiments are not limited in this manner and the I/O component 614 may include a combination of an input device and an output device to use for both inputting and outputting information into computing system 105, 205.

In some embodiments, in-vehicle electronic wallet system configuration 625 may include a display component 616 located within and integrated into the dashboard area of the vehicle. Display component 616 may constitute any display device capable of displaying information received from processor component 210. In the illustrated display component 616 is displaying receipt 675. As previous discussed, the receipt 675 may include information such as the retailer or store of sale, the date of the sale, the item being sold, and the total cost of the item. Various embodiments are not limited in this manner and display component 616 may display any information.

Figure 6B:
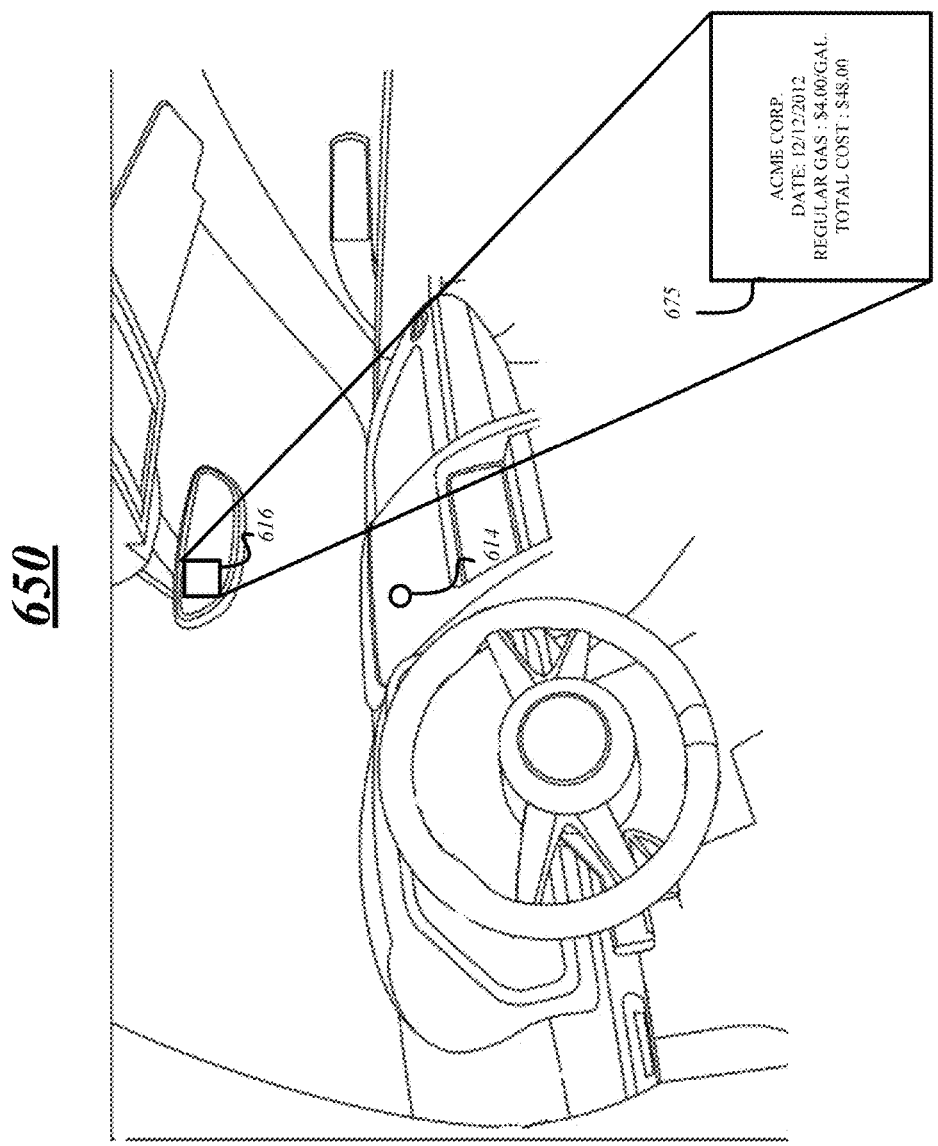
FIG. 6B illustrates an embodiment of a fourth in-vehicle electronic wallet system configuration.
Figure 6C:
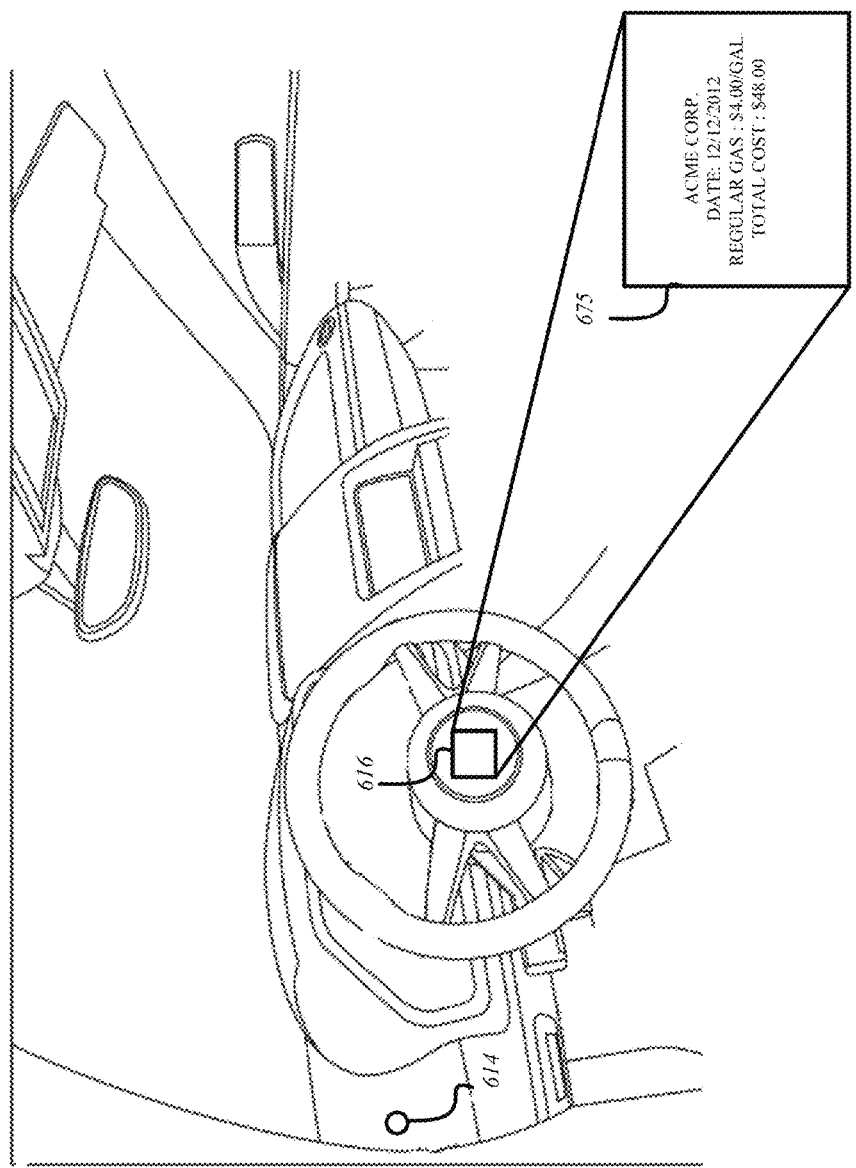
FIG. 6C illustrates an embodiment of a fifth in-vehicle electronic wallet system configuration.

FIGS. 6B/6C illustrate alternative embodiments of in-vehicle electronic wallet system configuration. In-vehicle electronic wallet system configuration 650 shows I/O component 614 integrated with a dashboard or portion thereof and display component 616 integrated with a rearview mirror. In-vehicle electronic wallet system configuration show I/O component 614 integrated into a different portion of the dashboard and the display component integrated into the steering wheel of the vehicle. However, as previous discussed, these and other components may be integrated into any portion of the vehicle and vehicle.

Figure 7:
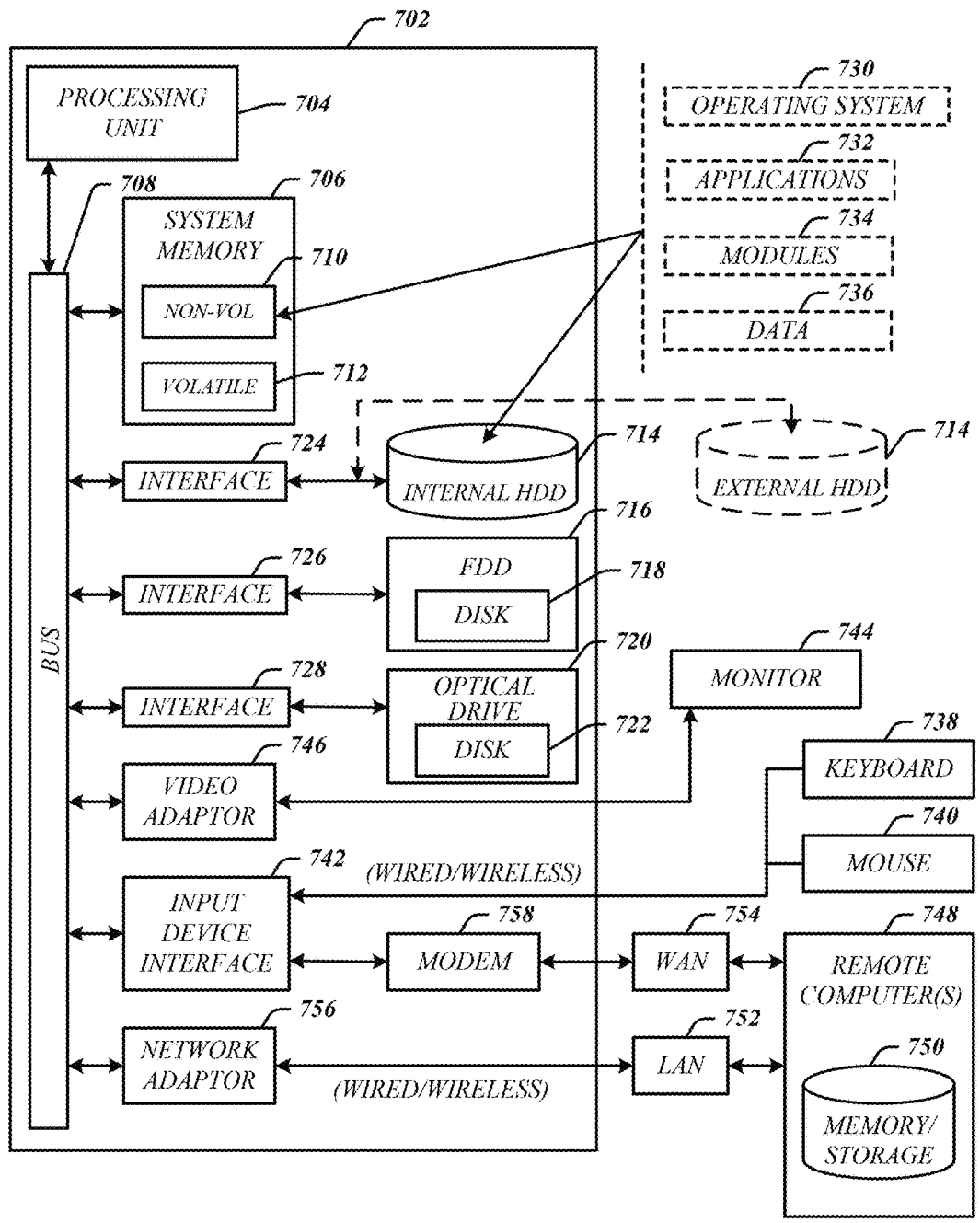
FIG. 7 illustrates an embodiment of a first computing architecture for an in-vehicle electronic wallet system.

FIG. 7 illustrates an embodiment of an exemplary computing architecture 700 suitable for implementing various embodiments as previously described. In one embodiment, the computing architecture 700 may comprise or be implemented as part of computing device 105, 205. As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, such as those described with reference to the processing component 212 shown in FIG. 2.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies. The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth. A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the in-vehicle electronic wallet system 100, 200 as previously described with reference to FIGS. 1-7 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through forty-five (1-45) provided below are intended to be exemplary and non-limiting.

In a first example, an electronic wallet for a vehicle may comprise an vehicle electronic wallet component coupled to a processor component. The vehicle electronic wallet component may comprise a contactless communication interface component to receive a request for payment for a transaction over a contactless communication link when in proximity to a payment processing entity, an electronic wallet authentication component to receive authentication information to approve the request for payment, and an electronic wallet payment component to send payment information corresponding to the payment account over the contactless communication link to the payment processing entity to enable payment for the transaction.

In a second example and in furtherance of any of the previous examples, an electronic wallet for a vehicle may comprise an vehicle electronic wallet component comprising an electronic wallet cloud activation component to activate a payment account for the vehicle electronic wallet component and to associate the payment account with vehicle information.

In a third example and in furtherance of any of the previous examples, an electronic wallet for a vehicle may comprise authentication information comprising a personal identification number or a voice passphrase, and electronic wallet payment component to send payment information based on a comparison of the authentication information and a stored authentication information.

In a fourth example and in furtherance of any of the previous examples, an electronic wallet for a vehicle may comprise an input/output (I/O) component located within the vehicle to receive the authentication information, the I/O component including one or more of a biometric sensor, a microphone, and a touch interface, and a display component located within the vehicle to display a receipt for the transaction.

In a sixth example and in furtherance of any of the previous examples, an electronic wallet for a vehicle may comprise an electronic wallet cloud activation component to send user details and a vehicle identification number of the vehicle to activate the payment account and associate the payment account with vehicle information.

In a seventh example and in furtherance of any of the previous examples, an electronic wallet for a vehicle may comprise an electronic wallet cloud activation component to activate a plurality of payment accounts for the vehicle electronic wallet component, the electronic wallet payment component to send payment information of one of the plurality of payment accounts to enable payment for the transaction.

In an eighth example and in furtherance of any of the previous examples, an electronic wallet for a vehicle may comprise an vehicle electronic wallet component to receive information from a location determination device indicating the vehicle is in motion indicated the payment processing entity, and the electronic wallet authentication component to indicate to a user the payment processing entity is approaching and receive authentication information to approve the request for payment.

In a ninth example and in furtherance of any of the previous examples, an electronic wallet for a vehicle may comprise an vehicle electronic wallet component may comprise an electronic wallet management component to receive the payment information and payment settings corresponding to the payment account and to store the payment information and payment settings in a secure location, the secure location comprising a local memory or a remote storage location.

In a tenth example and in furtherance of any of the previous examples, an electronic wallet for a vehicle may comprise payment settings that may comprise a maximum transaction amount, a transaction location policy, and a stored authentication information.

In a eleventh example and in furtherance of any of the previous examples, an electronic wallet for a vehicle may comprise payment information that may comprise, a user name, a credit card number, an expiration date, and a credit card security code.

In a twelfth example and in furtherance of any of the previous examples, an electronic wallet for a vehicle may comprise an electronic wallet management component to store payment information and payment settings corresponding to each one of a plurality of payment accounts in the secure location, the secure location comprising a local storage location or a remote storage location.

In a thirteenth example and in furtherance of any of the previous examples, an electronic wallet for a vehicle may comprise an electronic wallet management component to add, delete or modify the payment account, the payment account information or the payment account settings based on information received over a mobile communication link or via an I/O component.

In a fourteenth example and in furtherance of any of the previous examples, an electronic wallet for a vehicle may comprise an electronic wallet payment component to send loyalty account information corresponding to the payment processing entity to the payment processing entity for the transaction.

In a fifteenth example and in furtherance of any of the previous examples, an article may comprise a computer-readable storage medium comprising instructions that when executed enable a computing device to receive a request for payment for a transaction over a contactless communication link when a vehicle is in proximity to a payment processing entity, receive authentication information to approve the request for payment, and send payment information corresponding to the payment account over the contactless communication link to the payment processing entity to enable payment for the transaction.

In a sixteenth example and in furtherance of any of the previous examples, an article may comprise instructions that when executed enable the computing device to activate a payment account for the vehicle electronic wallet component and to associate the payment account with the vehicle.

In a seventeenth example and in furtherance of any of the previous examples, an article may comprise instructions that when executed enable the computing device to send payment information based on a comparison of the authentication information and stored authentication information.

In an eighteenth example and in furtherance of any of the previous examples, an article may comprise instructions that when executed enable the computing device to send user details and a vehicle identification number of the vehicle to activate the payment account and associate the payment account with the vehicle.

In an nineteenth example and in furtherance of any of the previous examples, an article may comprise instructions that when executed enable the computing device to activate a plurality of payment accounts for the vehicle electronic wallet component, the electronic wallet payment component to send payment information of one of the plurality of payment accounts to enable payment for the transaction.

In a twentieth example and in furtherance of any of the previous examples, an article may comprise instructions that when executed enable the computing device to receive the payment information and payment settings corresponding to the payment account and store the payment information and payment settings in a secure location, the secure location comprising a local memory or a remote storage location.

In a twenty-first example and in furtherance of any of the previous examples, an article may comprise instructions that when executed enable the computing device to send loyalty account information corresponding to the payment processing entity to the payment processing entity for the transaction.

In a twenty-second example and in furtherance of any of the previous examples, a computer-implemented method may comprise receiving a request for payment for a transaction over a contactless communication link when the vehicle is in proximity to a payment processing entity, receiving authentication information to approve the request for payment and sending payment information corresponding to the payment account over the contactless communication link to the payment processing entity to enable payment for the transaction.

In a twenty-third example and in furtherance of any of the previous examples, a computer-implemented method may comprise activating a payment account for the vehicle electronic wallet component and to associate the payment account with the vehicle.

In a twenty-fourth example and in furtherance of any of the previous examples, a computer-implemented method may comprise sending the request for payment to a mobile device over a mobile communication link and receiving the authentication information from the mobile device over the mobile communication link.

In a twenty-fifth example and in furtherance of any of the previous examples, a computer-implemented method may comprise sending user details and a vehicle identification number of the vehicle to activate the payment account and associate the payment account with the vehicle.

In a twenty-sixth example and in furtherance of any of the previous examples, a computer-implemented method may comprise sending payment information based on a comparison of the authentication information and a stored authentication information.

In a twenty-seventh example and in furtherance of any of the previous examples, a computer-implemented method may comprise receiving the authentication information from an I/O component including one or more of a biometric sensor, a microphone, and a touch interface and displaying a receipt for the transaction on a display component located within the vehicle.

In a twenty-eighth example and in furtherance of any of the previous examples, a computer-implemented method may comprise activating a plurality of payment accounts for the vehicle electronic wallet component, the electronic wallet payment component to send payment information of one of the plurality of payment accounts to enable payment for the transaction.

In a twenty-ninth example and in furtherance of any of the previous examples, a computer-implemented method may comprise receiving information from a location determination device indicating the vehicle is in motion indicating to a user the payment processing entity is approaching; and receiving authentication information to approve the request for payment.

In a thirtieth example and in furtherance of any of the previous examples, a computer-implemented method may comprise receiving the payment information and payment settings corresponding to the payment account; and storing the payment information and payment settings in a secure location, the secure location comprising a local memory or a remote storage location.

In a thirty-first example and in furtherance of any of the previous examples, a computer-implemented method may comprise storing payment information and payment settings corresponding to each one of a plurality of payment accounts in the secure location, the secure location comprising a local memory or a remote storage location.

In a thirty-second example and in furtherance of any of the previous examples, a computer-implemented method may comprise modifying the payment account, the payment account information or the payment account settings based on information received over a mobile communication link or via an I/O component.

In a thirty-third example and in furtherance of any of the previous examples, an apparatus may comprise means for receiving a request for payment for a transaction over a contactless communication link when a vehicle is in proximity to a payment processing entity; means for receiving authentication information to approve the request for payment; and means for sending payment information corresponding to the payment account over the contactless communication link to the payment processing entity to enable payment for the transaction.

In a thirty-fourth example and in furtherance of any of the previous examples, an apparatus may comprise means for activating a payment account for the vehicle electronic wallet component and to associate the payment account with the vehicle.

In a thirty-fifth example and in furtherance of any of the previous examples, an apparatus may comprise means for sending payment information based on a comparison of the authentication information and a stored authentication information.

In a thirty-sixth example and in furtherance of any of the previous examples, an apparatus may comprise means for sending the request for payment to a mobile device over a mobile communication link; and receiving the authentication information from the mobile device over the mobile communication link.

In a thirty-seventh example and in furtherance of any of the previous examples, an apparatus may comprise means for receiving the authentication information located within the vehicle; and means for displaying a receipt for the transaction located within the vehicle.

In a thirty-eighth example and in furtherance of any of the previous examples, an apparatus may comprise means for sending user details and a vehicle identification number of the vehicle to activate the payment account and associate the payment account with the vehicle.

In a thirty-ninth example, an apparatus may comprise means for activating a plurality of payment accounts for the vehicle electronic wallet component, the electronic wallet payment component to send payment information of one of the plurality of payment accounts to enable payment for the transaction.

In a fortieth example and in furtherance of any of the previous examples, an apparatus may comprise means for receiving information indicating the vehicle is in motion; means for indicating to a user the payment processing entity is approaching; and means for receiving authentication information to approve the request for payment.

In a forty-first example and in furtherance of any of the previous examples, an apparatus may comprise means for receiving the payment information and payment settings corresponding to the payment account; and means for storing the payment information and payment settings in a secure location.

In a forty-second example and in furtherance of any of the previous examples, an apparatus may comprise means for storing payment information and payment settings corresponding to each one of a plurality of payment accounts in the secure location.

In a forty-third example and in furtherance of any of the previous examples, an apparatus may comprise means for adding, deleting or modifying the payment account, the payment account information or the payment account settings based on information received over a mobile communication link or via an I/O component.

In a forty-fourth example and in furtherance of any of the previous examples, an apparatus may comprise means for sending loyalty account information corresponding to the payment processing entity to the payment processing entity for the transaction.

In a forty-fifth example and in furtherance of any of the previous examples, an electronic wallet for a vehicle may comprise at least a portion of the vehicle electronic wallet component integrated with a vehicle part.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An in-vehicle electronic wallet integrated into a vehicle, comprising:
a processor component;
a location determination device, operably coupled to the processor component, which determines a location of the vehicle and indicates that the vehicle is in motion; and
a vehicle electronic wallet component, at least a portion of which is in hardware, the vehicle electronic wallet component comprising:
a contactless communication interface component, at least a portion of which is in hardware, which receives a request for payment from a payment processing entity for a transaction over a contactless communication link when within a detected proximity to the payment processing entity;
an electronic wallet authentication component, at least a portion of which is in hardware, which receives authentication information and approves the request for payment based, at least in part, on the location of the vehicle determined by the location determination device and an indication from the location determination device that the vehicle is in motion towards the payment processing entity;
an electronic wallet payment component, at least a portion of which is in hardware, which:
sends payment information corresponding to a payment account over the contactless communication link to the payment processing entity for payment of the transaction responsive to receipt of the authentication information for approval of the request for payment, and
sends the request for payment, the location of the vehicle and the indication the vehicle is in motion towards the payment processing entity to the mobile device over the mobile communication link; and
an electronic wallet mobile interface component, at least a portion of which is in hardware, which receives authentication information and approves the request for payment from the mobile device over the mobile communication link.

2. The in-vehicle electronic wallet integrated into a vehicle of claim 1, the vehicle electronic wallet component comprising an electronic wallet cloud activation component, at least a portion of which is in hardware, which activates a payment account for the vehicle electronic wallet component and associates the payment account with vehicle information for the vehicle.

3. The in-vehicle electronic wallet integrated into a vehicle of claim 1, the authentication information comprising a personal identification number or a voice passphrase, the electronic wallet payment component sends payment information based on a comparison of the authentication information and a stored authentication information.

4. The in-vehicle electronic wallet integrated into a vehicle of claim 1, comprising:
an input/output (I/O) component, at least a portion of which is in hardware, which receives the authentication information for approval of the request for payment, the I/O component including one or more of a biometric sensor, a microphone, and a touch interface; and
a display component, at least a portion of which is in hardware, which displays a receipt for the transaction.

5. The in-vehicle electronic wallet integrated into a vehicle of claim 2, the electronic wallet cloud activation component sends user details and a vehicle identification number for activating the payment account and associating the payment account with vehicle information for the vehicle.

6. The in-vehicle electronic wallet integrated into a vehicle of claim 2, the electronic wallet cloud activation component activates a plurality of payment accounts for the vehicle electronic wallet component, the electronic wallet payment component sends payment information of one of the plurality of payment accounts for enabling payment for the transaction.

7. The in-vehicle electronic wallet integrated into a vehicle of claim 1, the vehicle electronic wallet component comprising an electronic wallet management component, at least a portion of which is in hardware, which receives the payment information and payment settings corresponding to the payment account and stores the payment information and payment settings in a secure location, the secure location comprising a local storage location or a remote storage location.

8. The in-vehicle electronic wallet integrated into a vehicle of claim 7, the payment settings comprising a maximum transaction amount, a transaction location policy, and a stored authentication information.

9. The in-vehicle electronic wallet integrated into a vehicle of claim 7, the payment information comprising, a user name, a credit card number, an expiration date, and a credit card security code.

10. The in-vehicle electronic wallet integrated into a vehicle of claim 7, the electronic wallet management component stores payment information and payment settings corresponding to each one of a plurality of payment accounts in the secure location, the secure location comprising a local storage location or a remote storage location.

11. The in-vehicle electronic wallet integrated into a vehicle of claim 7, the vehicle electronic wallet component comprising:
    an input/output (I/O) component, at least a portion of which is in hardware which receives information for the payment account; and
    the electronic wallet management component adds, deletes, or modifies the payment account, the payment account information or the payment account settings based on information for the payment account received via the I/O component.

12. The in-vehicle electronic wallet integrated into a vehicle of claim 1, the electronic wallet payment component sends loyalty account information corresponding to the payment processing entity to the payment processing entity via the contactless communication component for the transaction.

13. The in-vehicle electronic wallet integrated into a vehicle of claim 1, at least a portion of the vehicle electronic wallet component integrated with a vehicle part.

14. The in-vehicle electronic wallet integrated into a vehicle of claim 1, comprising an input/output (I/O) component, at least a portion of which is in hardware, which receives the authentication information for approval of the request for payment, the I/O component having at least one input device and being integrated into one of a fuel cap and a fuel door of the vehicle.

15. The in-vehicle electronic wallet integrated into a vehicle of claim 1, the electronic wallet authentication component generates a prompt responsive to receiving the request for payment from the payment processing entity, the prompt comprising haptic feedback via generation of a vibration of a component of the vehicle.

16. The in-vehicle electronic wallet integrated into a vehicle of claim 1, the vehicle electronic wallet transmits an availability indication to the payment processing entity responsive to a determination that the vehicle is within a detected proximity to the payment processing entity.

17. An article of manufacture comprising a non-transitory computer-readable storage medium comprising instructions that when executed by a computing system integrated into a vehicle, cause the computing system to:
    determine a location of the vehicle and indicate whether the vehicle is in motion;
    receive a request from a payment processing entity for payment for a transaction over a contactless communication link when within a detected proximity to the payment processing entity;
    receive authentication information for approving the request for payment based, at least in part, on the location of the vehicle and an indication the vehicle is in motion towards the payment processing entity;
    send payment information corresponding to a payment account over the contactless communication link to the payment processing entity for payment of the transaction responsive to receipt of the authentication information for approving the request for payment;
    send the request for payment, the location of the vehicle and the indication the vehicle is in motion towards the payment processing entity to a mobile device over a mobile communication link; and
    receive the authentication information for approving the request for payment from the mobile device over the mobile communication link.

18. The article of manufacture of claim 17 comprising instructions that when executed cause the computing system to activate the payment account and to associate the payment account with vehicle information for the vehicle.

19. The article of manufacture of claim 17, the authentication information comprising a personal identification number or a voice passphrase, and the instructions, when executed by the computing system, cause the computing system to send payment information based on a comparison of the authentication information and stored authentication information.

20. The article of manufacture of claim 17 comprising instructions that, when executed by the computing system, cause the computing system to send user details and a vehicle identification number to activate the payment account and associate the payment account with vehicle information for the vehicle.

21. The article of manufacture of claim 17, comprising instructions that, when executed by the computing system, cause the computing system to activate a plurality of payment accounts and send payment information of one of the plurality of activated payment accounts to enable payment for the transaction.

22. The article of manufacture of claim 17, comprising instructions that, when executed by the computing system, cause the computing system to:
    receive the payment information and payment settings corresponding to the payment account; and
    store the payment information and payment settings in a secure location, the secure location comprising a local storage location or a remote storage location.

23. The article of manufacture of claim 17, comprising instructions that, when executed by the computing system, cause the computing system to send loyalty account information corresponding to the payment processing entity to the payment processing entity for the transaction.

24. A computer-implemented method, by a computing device integrated into a vehicle, comprising:
    determining:
        a location of the vehicle, and
        an indication that the vehicle is in motion towards a payment processing entity;

receiving a request for payment for a transaction over a contactless communication link when the vehicle is within a detected proximity to the payment processing entity;

receiving authentication information for approving the request for payment based, at least in part, on the location of the vehicle and the indication that the vehicle is in motion towards the payment processing entity;

sending payment information corresponding to a payment account over the contactless communication link to the payment processing entity for payment of the transaction responsive to receipt of the authentication information for approving the request for payment;

sending the request for payment, the location of the vehicle and the indication the vehicle is in motion towards the payment processing entity to a mobile device over a mobile communication link; and receiving the authentication information for approving the request for payment from the mobile device over the mobile communication link.

25. The computer-implemented method of claim 24, comprising:

sending user details and a vehicle identification number for activating the payment account and associating the payment account with vehicle information.

\* \* \* \* \*